July 11, 1961
H. C. HARBERS ET AL
2,991,993
VEHICLE SPRING CONNECTOR
Filed Dec. 1, 1958
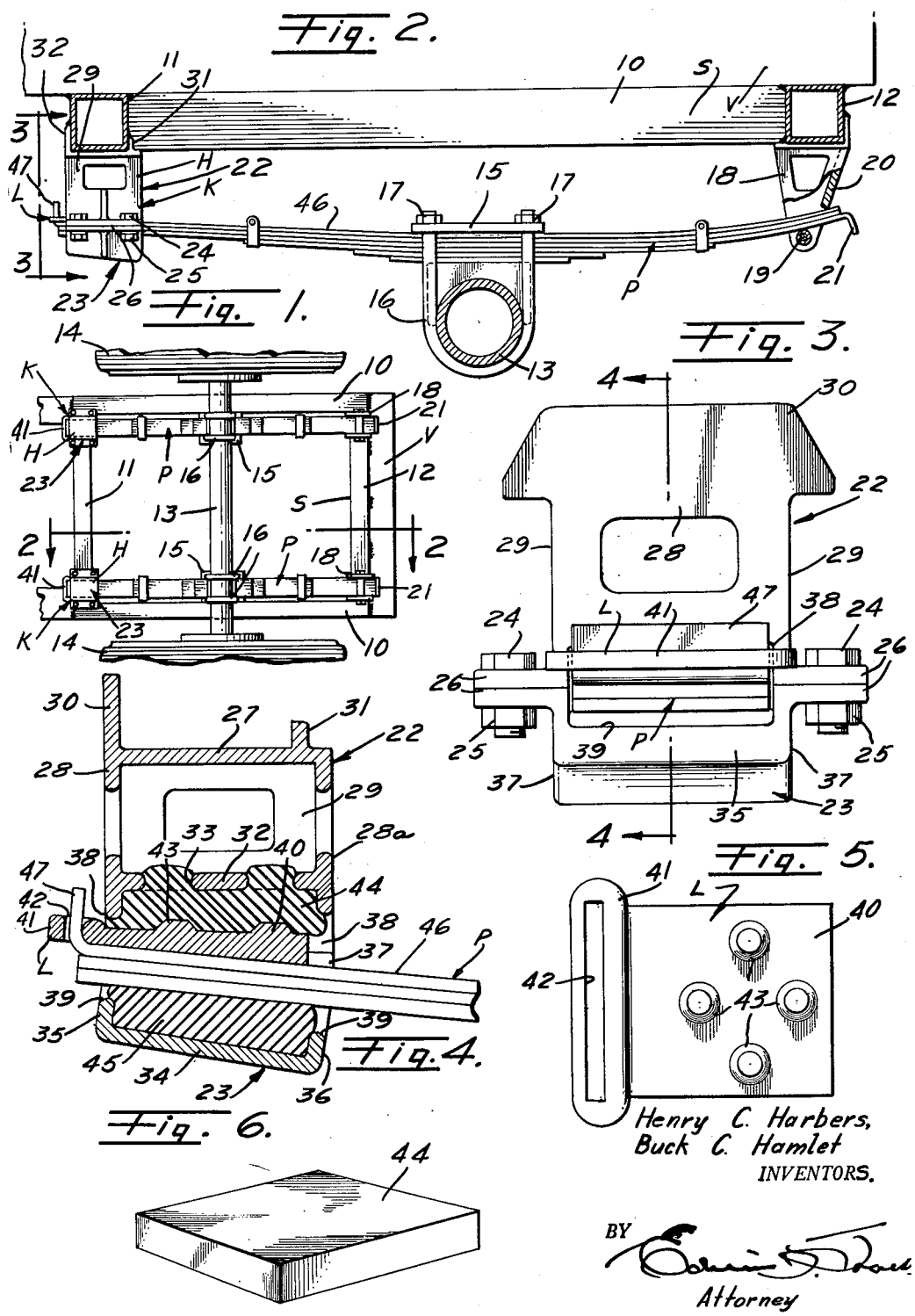
Henry C. Harbers,
Buck C. Hamlet
INVENTORS.
BY 
Attorney United States Patent Office 2,991,993
Patented July 11, 1961

2,991,993
VEHICLE SPRING CONNECTOR
Henry C. Harbers, Pasadena, and Buck C. Hamlet, La Puente, Calif., assignors to Western Unit Corporation, Los Angeles, Calif., a corporation of California
Filed Dec. 1, 1958, Ser. No. 777,474
13 Claims. (Cl. 267—30)

Our invention has to do with single-axle spring suspensions for trucks, trailers and similar wheeled vehicles, embodying a pair of leaf springs by which the axle is suspended from the truck frame.

It is a purpose of our invention to provide a pair of connectors for coupling the forward ends of the leaf springs to the truck frame so as to take up or absorb the driving force and torque in a manner to minimize wear and prevent distortion and breakage of the parts of the connectors and the spring ends; to eliminate the necessity of lubrication of the connectors; to maintain the axle at right angles to the major axis of the vehicle frame; and to maintain a fixed radius between the axle and the connectors.

It is also a purpose of our invention to provide a spring connector which embodies deformable resilient elements that function to yieldingly resist in a manner to absorb vertical movement of the forward spring end produced by the torque exerted on the spring, as well as lengthwise movement of the spring end produced by the driving thrust exerted thereon. Thus when employing two connectors for the two springs the deformable elements operate to maintain the axle at right angles to the truck frame, and the axle at a fixed distance from the connectors, and without wear or damage to either the hangers or the springs. In addition, the deformable elements of each connector operate to absorb turning or twisting movement of the forward spring end due to relative transverse rocking movement of the truck frame and the axle as occurs when the wheels traverse uneven terrain, and in a manner to prevent breakage or distortion of said spring end.

We will describe only one form of spring connector embodying our invention for single-axle spring suspensions for wheeled vehicles, and will then point out the novel features thereof in claims.

In the accompanying drawings:

FIG. 1 is a view showing in bottom plan the rear end portion of a truck or other vehicle frame having applied thereto a sub-frame carrying springs suspending a wheeled axle therefrom, and one form of connector for coupling the forward ends of the springs to the sub-frame.

FIG. 2 is an enlarged vertical sectional view taken on the line 2—2 of FIG. 1.

FIG. 3 is an enlarged front elevational view of one of the connectors with the respective spring therein, and taken on the line 3—3 of FIG. 2.

FIG. 4 is a vertical sectional view taken on the line 4—4 of FIG. 3.

FIG. 5 is a detailed top plan view of the locking member embodied in the connector.

FIG. 6 is a detailed perspective view of one of the deformable elements embodied in the connector.

Referring more particularly to the drawings, in FIGS. 1 and 2 is shown the rear end portion of a vehicle frame V, to the under side of which is welded, or otherwise secured, a sub-frame S of rectangular form and comprising a pair of side beams 10, a front cross beam 11 and a rear cross beam 12. An axle 13 having wheels 14 on its opposite ends extends transversely of the sub-frame S medially of its ends, and is suspended therefrom by a pair of leaf springs P. These springs extend longitudinally of the sub-frame S and each is secured to the axle 13 by a plate 15 and a U-shaped tie bolt 16 having the usual nuts 17 at the ends thereof.

The rear end of each spring P is slidably held in a guide 18 welded or otherwise secured to the rear beam 12, this guide having a bolt 19 upon which the spring end is supported, and a wall 20 above the spring end for limiting upward movement thereof in the guide. A guide so constructed permits free longitudinal movement of the spring end and yet the spring end is held against lateral movement. One of the leaves of each spring P is formed with a down-turned end 21 which functions to limit movement of the spring end toward the axle 13 and thus to prevent separation of the spring end from the guide.

The forward end of each spring P is coupled to the front end beam 11 by a connector, indicated generally at K, constituting our invention and, in the present instance, comprising a hanger H composed of an upper section 22 and a lower section 23 secured to each other by bolts 24 having nuts 25 thereon. The bolts 24 extend through flanges 26 formed on the confronting sides of the sections 22 and 23, and the bolts and nuts afford means for clamping the flanges to each other.

The upper hanger section 22 comprises an upper wall 27, a front wall 28, a rear wall 28a, and side walls 29. Extending upwardly from the front wall is a flange 30, and extending upwardly from the upper wall 27 adjacent the rear wall 28a is a second flange 31. As best shown in FIG. 2 these flanges 30 and 31 are spaced from each other to accommodate the front cross beam 11, and they are welded to such beam so that the entire connector K is secured to the beam in depending relation thereto. The upper hanger section 22 also includes a lower wall 32 spanning the front and rear walls 28 and 28a adjacent the lower ends thereof, and this wall is formed with a plurality of openings 33.

The lower hanger section 23 comprises an inclined bottom wall 34, front and rear walls 35 and 36, and side walls 37, on the upper edges of which are formed the flanges 26. The flanges 26 of the upper hanger section 22 are formed on the side walls 29. As best shown in FIG. 3, the front and rear walls of the hanger sections 22 and 23 are provided with recesses 38 and 39, respectively, provided for the purpose of accommodating the forward end of the spring P as well as a locking key L, and in the manner shown in FIG. 4.

The locking key L is formed of metal, and comprises a plate 40 tapered in thickness from one end to the other, and at its thin end formed with a transverse enlargement 41 provided with a slot 42 extending longitudinally therein. On its upper side the plate 40 is formed with a plurality of projections 43 at points vertically registering with the openings 33 when the key is in proper position within the hanger. Each projection 43 is preferably of frusto-conical form.

Within the upper hanger section 22 and between the locking key L and the wall 32 is interposed a deformable resilient element 44, while in the lower hanger section 23 is a similar deformable resilient element 45. These two elements may be constructed of resilient rubber or neoprene, and each has the original form shown in detail in FIG. 6.

As the parts of the connector are assembled the forward end of the spring P extends between the hanger sections 22 and 23 with the locking key L on the top side of the spring end, the element 44 between the key L and the wall 32 and element 45 between the spring end and the walk 34. The master or upper leaf 46 of the spring P has its forward end bent upwardly to provide a tongue 47 that extends upwardly through the slot 42 of the locking key.

To assemble the parts of the connector, the lower hanger section 23 is applied to the upper hanger section after the element 44, key L, and spring end have been positioned as above described so that when the lower hanger section is applied with the element 45 contained therein, the bolts 24 can be adjusted to cause the lower hanger section to exert a pressure upwardly so as to clamp the spring end between the element 45 and the key L, and at the same time to force the key upwardly.

Such upward movement of the key causes the front and rear edge portions of the element 44 to be so deformed that they are extended into the recesses of the section 22, and the projections 43 to project portions of the element into the openings 33. Thus the element 44 is not only locked against edgewise displacement in the hanger, but is also held under compression. The element 45 is likewise held under compression by the lower hanger section 23, and in firm contact with the lower side of the spring P.

In practice, where the forward ends of the two springs P are coupled to the sub-frame by the two connectors, each connector functions to take up or absorb the driving force and torque exerted on the spring through the axle 13, and at the same time to maintain the axle at right angles to the major axis of the vehicle frame. Also they operate to prevent lateral shifting of the axle bodily along the sub-frame, and thus the two springs operate as radius rods.

Since the forward end of each spring is coupled to the hanger through the medium of the deformable elements 44 and 45, and such elements are held under compression, they function to absorb movement of the spring end vertically as produced by the torque exerted on the spring, as well as to absorb lengthwise movement of the spring end produced by the driving thrust exerted thereon. Additionally, these elements operate to absorb turning or twisting movement of the forward spring end due to relative transverse rocking movement of the truck frame and the axle as occurs when the wheels traverse uneven terrain.

In absorbing all movements of the spring end as described no damage to either the spring or the hanger can occur as a result of such movements, and yet the driving thrust exerted on the spring is fully transmitted to the sub-frame.

Through adjustment of the bolts 24 the lower hanger section can be adjusted vertically to vary the degree of compression of the elements 44 and 45, and, hence, the clamping action with respect to the spring to, in turn, vary the degree of absorption of the spring movements by the elements.

As previously described herein the locking key plate 40 is tapered in thickness, and the bottom wall 34 of section 23 is inclined. Thus the spring end as extended between the plate and the lower element 45 can be accommodated in its normal curvature lengthwise.

Our spring connectors have been shown and described herein as secured to the sub-frame in order that the entire assembly can be manufactured as a unit for attachment to any existing vehicle frame, but it is to be understood that the sub-frame can be dispensed with and the connectors and guides connected directly to the vehicle frame.

Although we have herein shown and described only one form of vehicle spring connector embodying our invention, it is to be understood that various changes and modifications may be made herein without departing from the spirit of our invention and the spirit and scope of the appended claims.

What we claim is:

1. In combination: a leaf spring; an upstanding lip on one end of the master leaf of said spring; a hanger movably receiving that end of said spring on which said lip is formed and so that the lip is exposed to the outer side of the hanger; a locking member within the hanger having an end projecting from the hanger end provided with a transverse slot receiving said lip; and a pair of deformable resilient elements contained in the hanger, one of said elements positioned at the top side of said member and held under compression between and by the hanger and said member, and the other of said elements held under compression by and between the bottom of the hanger and the spring.

2. A combination as set forth in claim 1, wherein a portion of the hanger above said member is formed with openings, and the upper side of said member is formed with projections registering with the openings and operating to deform that one of said elements at the top side of said member so that portions thereof are extended into the openings.

3. A combination as set forth in claim 2, wherein each of said projections is of truncated conical form.

4. A connector for coupling to a vehicle frame one end of an axle-suspension leaf spring, including: a hanger adapted to be fixed to the vehicle frame and in which said spring end is adapted to be received for movement therein, the hanger including a bottom wall and a perforated upper wall between which walls said spring is adapted to be received; a locking key between said walls and adapted to be disposed at the upper side of said spring end; means on said key adapted to engage said spring end and coacting with a part of the hanger for securing the spring end against removal from the hanger; projections of the upper side of said key registering with the perforations in said upper wall; an upper deformable resilient element between said member and said upper wall held under compression by said upper wall and said key so that said projections deform portions of said element into said perforations; and a lower deformable resilient element in the bottom of the hanger to form a seat for said spring end and held under compression therein.

5. A connector as embodied in claim 4, wherein the hanger is formed of two superimposed sections, the upper section thereof including said upper wall, and the lower section containing said lower element; and means connecting said sections to place said elements under compression.

6. A connector as embodied in claim 4, wherein the hanger is formed of two superimposed sections, the upper section thereof including said upper wall, and the lower section containing said lower element, said member of wedge form, and the bottom wall of said bottom section inclined from one side thereof to the other, and means connecting said sections to place said elements under compression.

7. A connector for coupling to a vehicle frame the forward end of an axle-suspension leaf spring, including: a hanger adapted to be secured to the vehicle frame and in which said spring end is received, the hanger having a transverse wall above said spring end formed with openings; projections fixed to the top side of said spring end in general alignment with said openings; and a deformable resilient element between said wall and said projections, said element held under compression between said wall and said spring end so that the projections deform portions of said element into said openings.

8. In combination: a leaf spring having an upstanding lip on one end thereof; a hanger receiving said spring end so that said lip is disposed to the outer side of the hanger; the hanger having a tranverse wall above said spring end formed with perforations; projections fixed to the top side of said spring end in general alignment with said openings; and a deformable resilient element between said wall and said projections, said element held under compression between said wall and said spring end so that the projections deform portions of said element into said openings.

9. An article of manufacture comprising a locking element suitable for use in locking the upturned end of a leaf spring assembled to a resilient compression element adapted to be interposed between a load transmitting member and said locking element; said locking element comprising an elongated plate having opposed surfaces inclined slightly to one another lengthwise thereof, the thinner end of said locking element having an elongated narrow opening extending transversely thereof adapted to receive and to fit over the upturned end of a spring leaf, and one surface of said locking member being provided with a plurality of projections adapted to mate with complementally shaped depressions of a resilient compression element when interposed between said locking element and a load transmitting member.

10. The combination defined in claim 7 characterized in that said connector includes means forming part of said leaf spring positioned closely adjacent but spaced from one transverse wall of said hanger, said last-mentioned means being engageable with said one transverse wall to limit relative movement of said leaf spring and said hanger in a direction extending lengthwise of said leaf spring.

11. The combination defined in claim 7 characterized in that said hanger includes a lower keeper section underlying and spaced from the underside of the adjacent end of said leaf spring, and resilient pad means interposed between said leaf spring and said lower keeper section and acting as a shock absorbing substantially noiseless buffer between said leaf spring and said keeper section.

12. The combination defined in claim 11 characterized in that said lower keeper section is detachable from said hanger, and means including fasteners for holding said resilient pad and said keeper section assembled to said hanger.

13. The combination defined in claim 7 characterized in the provision of means including fasteners for holding the end of said leaf spring pressed under high pressure upwardly against the transverse wall of said hanger thereby to maintain said leaf spring end and the openings in said transverse wall pressed into and interlocked with said resilient element.

References Cited in the file of this patent

UNITED STATES PATENTS

| | | |
|---|---|---|
| 1,009,696 | Simpson | Nov. 21, 1911 |
| 1,697,871 | Jansson | Jan. 8, 1929 |
| 1,792,038 | Rossi | Feb. 10, 1931 |
| 2,039,759 | Webb | May 5, 1936 |
| 2,407,236 | Heiney | Sept. 10, 1946 |
| 2,434,304 | Wilson | Jan. 13, 1948 |
| 2,691,519 | Bennett et al. | Oct. 12, 1954 |
| 2,831,674 | Brown et al. | Apr. 22, 1958 |

FOREIGN PATENTS

| | | |
|---|---|---|
| 496,607 | Germany | Apr. 24, 1930 |